(12) United States Patent
Kanga et al.

(10) Patent No.: US 11,670,147 B2
(45) Date of Patent: Jun. 6, 2023

(54) METHOD AND APPARATUS FOR CONDUCTING SURVEILLANCE

(71) Applicant: iOmniscient Pty Ltd, Gordon (AU)

(72) Inventors: Rustom Adi Kanga, Gordon (AU); Ivy Lai Chun Li, Gordon (AU)

(73) Assignee: iOmniscient Pty Ltd, Gordon (AU)

( * ) Notice: Subject to any disclaimer, the term of this patent is extended or adjusted under 35 U.S.C. 154(b) by 0 days.

(21) Appl. No.: 16/079,357

(22) PCT Filed: Feb. 27, 2017

(86) PCT No.: PCT/AU2017/050169
§ 371 (c)(1),
(2) Date: Aug. 23, 2018

(87) PCT Pub. No.: WO2017/143407
PCT Pub. Date: Aug. 31, 2007

(65) Prior Publication Data
US 2019/0051127 A1   Feb. 14, 2019

(30) Foreign Application Priority Data
Feb. 26, 2016   (AU) .............................. 2016900711

(51) Int. Cl.
*G08B 13/196* (2006.01)
*G08B 25/08* (2006.01)
(Continued)

(52) U.S. Cl.
CPC ....... *G08B 13/19615* (2013.01); *G06V 20/52* (2022.01); *G08B 13/19604* (2013.01);
(Continued)

(58) Field of Classification Search
CPC ........ G08B 13/19615; G08B 13/19604; G08B 13/19645; G08B 13/19658; G08B 25/08; G06K 9/00771; H04N 21/4728
(Continued)

(56) References Cited

U.S. PATENT DOCUMENTS 6,937,651 B1   8/2005   Brill et al.
7,492,821 B2 *  2/2009   Berman ............. H04N 21/4223
                                                  375/240.1
(Continued)

FOREIGN PATENT DOCUMENTS

AU      2009243916 B2   3/2013
EP         1953699 A1   8/2008
(Continued)

OTHER PUBLICATIONS

PCT; PCT App. No. PCT/AU2017/050169; International Preliminary Report on Patentability With Annexes dated Jun. 22, 2018; pp. 1-99.
(Continued)

*Primary Examiner* — Christopher S Kelley
*Assistant Examiner* — Asmamaw G Tarko
(74) *Attorney, Agent, or Firm* — Fitch, Even, Tabin & Flannery, LLP

(57) ABSTRACT

The present invention relates to a method and apparatus for processing video image data, so as to apply different types of processing to different aspects of video image data. A detection process is arranged to detect a item, object or event appearing or occurring in a scene being viewed by an image device. An image data process is responsive to the detection of the object or event and to control information to process the image data for a portion of the scene where the object or event appears or occurs, differently from the processing of the image data associated with the rest of scene. For
(Continued)

example, the object may be a person's face, and the face image data may be processed to produce high resolution data, the rest of the scene being provided in low resolution. This saves on processing, transmission and storage.

27 Claims, 13 Drawing Sheets

(51) Int. Cl.
*G06V 20/52* (2022.01)
*H04N 21/4728* (2011.01)

(52) U.S. Cl.
CPC . *G08B 13/19645* (2013.01); *G08B 13/19658* (2013.01); *G08B 25/08* (2013.01); *H04N 21/4728* (2013.01)

(58) Field of Classification Search
USPC .......................................................... 348/159
See application file for complete search history.

(56) References Cited

U.S. PATENT DOCUMENTS

| | | | |
|---|---|---|---|
| 7,688,997 B2 | 3/2010 | Gibbins et al. | |
| 2004/0015289 A1* | 1/2004 | Poland | G08G 1/054 702/155 |
| 2006/0062478 A1 | 3/2006 | Cetin et al. | |
| 2006/0165386 A1 | 7/2006 | Garoutte | |
| 2006/0269104 A1* | 11/2006 | Ciolli | G08G 1/052 382/104 |
| 2009/0251530 A1* | 10/2009 | Cilia | G07C 5/0866 348/39 |
| 2009/0254572 A1* | 10/2009 | Redlich | G06Q 10/06 |
| 2009/0297023 A1 | 12/2009 | Lipton et al. | |
| 2010/0250497 A1* | 9/2010 | Redlich | H04L 63/0227 707/661 |
| 2011/0128150 A1* | 6/2011 | Kanga | G08B 13/19669 340/541 |
| 2012/0169923 A1* | 7/2012 | Millar | H04N 19/23 348/399.1 |
| 2014/0355069 A1* | 12/2014 | Caton | G06F 3/1238 358/3.28 |
| 2015/0113634 A1 | 4/2015 | Mau | |
| 2015/0379355 A1* | 12/2015 | Kanga | H04N 7/188 382/103 |
| 2016/0012297 A1 | 1/2016 | Kanga et al. | |
| 2016/0014133 A1* | 1/2016 | Kanga | G06V 40/103 726/4 |
| 2016/0019428 A1 | 1/2016 | Martin | |
| 2016/0078302 A1 | 3/2016 | Kanga et al. | |

FOREIGN PATENT DOCUMENTS

| | | |
|---|---|---|
| JP | 2004120341 A | 4/2004 |
| JP | 2005094799 A | 4/2005 |
| JP | 2007235191 A | 9/2007 |
| JP | 2009246917 A | 10/2009 |
| WO | 2003044752 A1 | 5/2003 |
| WO | 2007126525 A2 | 11/2007 |
| WO | 2007126525 A2 | 7/2008 |
| WO | 2009/097449 A1 | 8/2009 |
| WO | 2009135253 A1 | 11/2009 |

OTHER PUBLICATIONS

Mashiyama, Shota et al.; "Accuracy Improvement of Non-contact Activity Recognition Using Low-Resolution Thermopile Sensor Array"; The Institute of Electronics Information and Communication Engineers; Feb. 22, 2016; vol. 115; pp. 159-164; English abstract.

Omogbenigun, Olutope; "Examination report No. 2 for standard patent application"; Examination Report; dated Dec. 14, 2021; pp. 1-5; Sydney, Australia.

* cited by examiner

METHOD AND APPARATUS FOR CONDUCTING SURVEILLANCE

CROSS-REFERENCE TO RELATED APPLICATIONS

This application is a U.S. national phase application filed under 35 U.S.C. § 371 of International Application Number PCT/AU2017/050169, filed Feb. 27, 2017, designating the United States, which claims benefit of Australian Patent Application No. 2016900711, filed Feb. 26, 2016.

FIELD OF THE INVENTION

The present invention relates to a method and apparatus for processing image data, and, particularly, but not exclusively, to a method and apparatus for surveillance of a scene which is arranged to process video image data of the scene depending on items or events so present or occurring in the scene.

BACKGROUND OF THE INVENTION

Current video surveillance apparatus comprises a camera and processing equipment (such as a computing apparatus) to obtain image data, process the image data and transmit it to end user devices for rendering of the video. Alternatively or additionally, the computing apparatus can store the image data for later viewing by user devices.

Processing of high resolution image data requires large capacity resources. If an entire image data stream from a high resolution camera is to be stored and/or transmitted, high bandwidth and storage capacity systems are required. This can be a major problem in surveillance, or any application involving cameras, such as CCTV cameras, observing scenes, and where high resolution cameras monitor scenes for extended periods of time.

To store and/or transmit all the image data for a high resolution image can be extremely costly.

In order to reduce the strain on resources, various image data processing techniques may be used. One well-used image data processing technique is to determine only changes that are taking place in a scene (motion detection) and only transmit the motion or change in the scene. At regular intervals, an entire frame, including the background, may be transmitted. Even with this known technique, however, the resources required to store and/or transmit all the data necessary for high definition can be prohibitive.

The present applicants have developed an earlier system, which captures a high resolution image stream and a low resolution image stream of a scene. The low resolution image stream is monitored to detect objects or events. On detection of an object or an event in the low resolution image stream, the corresponding area is captured from the high resolution image stream, so the detected object or event is obtained in high resolution. This development is described in applicant's earlier Australian Patent No. 2009243916, the contents of which are incorporated herein by reference.

There is a need for further improvements in surveillance systems.

SUMMARY OF INVENTION

In accordance with a first aspect, the present invention provides an apparatus for processing image data comprising a processor, a memory, and an operating system supporting computer processes, an image data process arranged to receive image data of a scene, a detection process arranged to detect an item or event appearing or occurring in the scene, the image data process being responsive to detection of an item or event to process the image data for a portion of the scene where the item or event appears or occurs, differently from the image data associated with the rest of the scene, wherein the portion of the scene is a portion focused about the item or event.

In an embodiment, therefore, image data associated with portions of the scene (associated with items or events occurring in the scene) can be processed differently from image data associated with the rest of the scene. For example, the computing apparatus may be arranged for identification of faces. Faces occurring in the scene are identified, and then the image data associated with those faces is processed differently from to other image data. For example, different compression rates may be applied to the image data associated with the faces. Any other processing may be applied.

For example, in an embodiment, image data relating to the face can be processed at a compression rate which results in relatively high resolution, and the rest of the image data can be processed at a compression rate which results in relatively low resolution. This has the advantage that the entire scene does not have to be stored and/or transmitted at high resolution. Only the parts of the scene (e.g. the parts that contain the faces) that contain the important required information are transmitted and/or stored at a high resolution. This saves substantially in transmission and/or storage capacity.

The scene may have multiple items or events that may be processed in a different manner, e.g. compressed at different rates. This advantageously enables items and events that are considered to be important to be processed differently from the rest of the scene and saving transmission and/or storage capacity, whilst ensuring that the important details are provided e.g. in high resolution.

In an embodiment, the image data process may be arranged to process the image data by varying compression rate, compression type, resolution, frame rate or any other type of processing.

In an embodiment, the "background" scene may be set to record at lower resolution. In embodiments, the "background" is parts of the scene that change less over time e.g. non-moving items. In this embodiment, the foreground (e.g. moving objects and other items that change more rapidly) may be processed in a higher resolution. In addition, "important" items or events that are designated (e.g. faces) may be processed at an even higher resolution. The system may therefore be arranged to optimize the processing of data while still providing detailed information about the "important" selected events and items. Events may include any events, such as a person falling over, someone painting graffiti or any other event. The video data around these events may be processed differently from the other video data. Any events or objects may be captured and processed differently.

In an embodiment, the apparatus comprises a redaction process which may be implemented to redact selected information. For example, faces of identified people may be redacted, identified items may be redacted during the process, etc. The faces may then be stored in a separate secured database. In an embodiment, where an authorised person accesses the system with the appropriate key, they can reverse the redaction process. In the reversal process, the system retrieves the high resolution image from the secured database and inserts it in the appropriate part of the image based on the meta-data information.

In an embodiment, the apparatus comprises a meta-data process which is arranged to process the image data to produce meta-data of items, events, etc. The meta-data process may produce meta-data of an entire item or object, known as a "meta object". The meta-data can be transmitted and/or stored with the processed image data. In an embodiment, the detection process may include an identification process arranged to identify objects/items and/or events. Meta-data may then be produced in accordance with the identification process to identify an object/item or event. For example, a person may be identified and the meta-data may include the name of the person. It will be appreciated that such meta-data may be very useful in, for example, security systems.

In an embodiment, an object or item may be saved or transmitted by different processing (e.g. at a compression rate that gives higher resolution), together with meta-data which may define an outline or position of an object/item within an image. This "meta object" can be used to supplement a video monitoring system(VMS) where the VMS may already have recorded the entire image in low resolution. This is something that often happens with video monitoring systems, where everything is recorded in low resolution. The system may be able to superimpose the meta object on the low resolution image at the appropriate part of the low resolution image so that the meta object is shown in high resolution, for example. The apparatus may enable a user, for example, to designate an object that they wish to see in high resolution, and, utilising the meta-data outline, the meta object is fetched from storage in high resolution.

In an embodiment, a plurality of different processing may be applied for a plurality of portions of image data associated with portions of the scene. Different compression rates may be applied to the image data associated with different items or events in the scene, for example.

In an embodiment, the apparatus comprises a control process which is arranged to set parameters for the identification process to identify items or events in accordance with the parameters. For example, the parameters may include that the item is a "face", or "car" or any object. The parameters may define that the event is a particular occurrence, such as a "red car moving through the scene". The red car would be identified by the identification process and different image processing applied to the image data associated with the red car moving through the scene. Any control parameters may be applied for the identification process. In an embodiment, the control process is also arranged to control the processing provided by the image data i.e. different compression rates for different items, different events, different frame rates, different types of compression, etc.

In an embodiment, control data may be provided to the control process for operation. In an embodiment, the control data may be provided as user surveillance control data from a user device. This aspect of the invention is not limited to the control data being provided by a user, however. It may be preset for the apparatus, in another alternative. It may be set by an administrator.

In accordance with a second aspect, the present invention provides a method of processing image data comprising the steps of receiving image data of a scene, detecting an item or event appearing or occurring in the scene, and responsive to the detection of the item or event, processing the image data for a portion of the scene where the item or event appears or occurs differently from the image data associated with the rest of the scene, wherein the portion of the scene is a portion focused about the item or event.

In accordance with a third aspect, the present invention provides a computer program, comprising instructions for controlling a computer to implement an apparatus in accordance with the eleventh aspect of the invention.

In accordance with a fourth aspect, the present invention provides a computer readable media providing a computer program in accordance with the third aspect of the invention.

In accordance with a fifth aspect, the present invention provides a data signal comprising a computer program in accordance with the third aspect of the invention.

In accordance with a sixth aspect, the present invention provides an apparatus for processing image data, comprising a computing apparatus having a processor, memory and an operating system supporting computer processes, a control process arranged to receive user surveillance control data, an image data process arranged to receive image data, the image data process being responsive to the control process to selectively process the image data according to surveillance parameters obtained from the control data.

In an embodiment, the image data is of a scene being surveyed by a surveillance device. In an embodiment, the image data is received from a surveillance device.

In an embodiment, the image data is received from a storage device, or received from a network.

In an embodiment, the surveillance parameters include object(s) of interest, specific object(s), area of interest, foreground of a scene, variable resolution/frame rate, by section based on importance/priority, based on events. The surveillance parameters may include any other parameters.

In an embodiment, the user surveillance control data may be provided by an end user. In an embodiment, the user surveillance control data is provided from a user device.

In an embodiment, the apparatus has the advantage that an end user can provide input to configure image data processing parameters. For example, the end user may want to view faces in a particular scene, and surveillance control data may be generated to indicate that the user wishes to identify faces. The apparatus may then process the image data accordingly. For example, it may identify objects it considers to be faces, and provide that image data in high resolution, other image data being provided in relatively low resolution. In an embodiment, the user is able to configure the system via the control data to implement any surveillance parameters.

In an embodiment, the control data may include item identifiers of items that may be present in a scene being surveyed by the surveillance device. For example, the items may include "vehicle", "face", "cars" or any other item.

In an embodiment, the control data may include an item attribute e.g. colour of the item, size of the item, or any other attribute of the item.

In an embodiment, the control data may comprise item behaviour e.g. motion of the item, speed of the item or other behaviour.

In an embodiment, the control data may be in the form of language statements entered by a user, and the control process is arranged to interpret the language statement to provide the surveillance parameters to the image data process. For example, the control data may include a language statement such as "any red [item attribute] vehicle [item identifier] that enters [item behaviour] the scene". Control data may include any other language statement.

In an embodiment, the apparatus comprises a meta-data process which is arranged to process the image data to produce meta-data about items, item attributes and item behaviour. This meta-data can be accessed via the control data (e.g. item identifier, item attribute, item behaviour) to enable reproduction of the video based on the control data. In an embodiment, as discussed above, the apparatus includes an identification process which is arranged to identify items/objects or events. In an embodiment, meta-data be produced relating to the identification of the items/objects or events. For example, the meta-data may include names of persons identified.

In an embodiment, therefore, the user is able to configure the system via the control data to implement different compression depending on surveillance parameters obtained from the control data. The user may also search the image data using the control data. The video may be reconstructed based on the search parameters (e.g. including item identifier, item attribute, item behaviour).

In an embodiment, the selective processing of the image data may comprise implementing different compression for different aspects of the image data. If the end user wishes to identify faces, for example, faces may be detected, or objects that are considered to potentially be faces may be detected, and the image data for these objects compressed at a different rate to other image data in the scene. Image data may then be transmitted and/or stored at the variable compressed rate.

Different compression techniques may be applied to the image data, not only different compression rates.

In an embodiment, the apparatus comprises a user control interface which enables the user to input user surveillance control data. The user control interface may be implemented via a user device, such as a control terminal, or user computing device, such as a tablet, smart phone, PC, laptop or any other computing device.

In an embodiment, the image data process is arranged to separate the image data into foreground image data and background image data, and process the foreground image data differently to background. For example, the foreground data may be provided at higher frame rates and/or different resolutions than the background data. This may be done in addition to the selective processing of the image data in accordance with the surveillance control data, so a plurality of different forms of processing may be applied.

In an embodiment, the control data may determine whether the image data process separates the image data into foreground and background. Foreground and background processing may therefore be preconfigured, or under user control.

In accordance with a seventh aspect, the present invention provides a method of processing image data, comprising the steps of receiving image data of a scene, receiving surveillance control data and processing the image data based on the surveillance control data, according to surveillance parameters effected by the control data.

In an embodiment, the image data is of a scene being surveyed by a surveillance device. In an embodiment, the image data is received from a surveillance device.

In an embodiment the image data is received from a storage device, or received from a network.

In an embodiment, the surveillance parameters include object(s) of interest, specific object(s), foreground of a scene, variable resolution/frame rate, by section based on importance/priority based on events. The surveillance parameters may also include any other parameters.

In an embodiment, the method comprises the step of processing image data to produce meta-data. In an embodiment, the meta-data includes data about items in the scene, item attributes and item behaviour. In an embodiment, the method comprises the step of utilising the meta-data to implement varying image processing according to the surveillance control data. The control data may include commands referring to the meta-data to control the image processing. For example, the control data may specify a particular item (e.g. a face) and require it to be provided in high resolution. In an embodiment, the method comprises the step of utilising the meta-data to search the image data in accordance with the control data.

In an embodiment, the method includes the step of reconstructing video located by the search process.

In accordance with an eighth aspect, the present invention provides a computer program, comprising instructions for controlling a computer to implement an apparatus in accordance with the sixth aspect of the invention.

In accordance with a ninth aspect, the present invention provides a computer readable medium, providing a computer program in accordance with the eighth aspect of the invention.

In accordance with a tenth aspect, the present invention provides a data signal, comprising a computer program in accordance with the eighth aspect of the invention.

In accordance with an eleventh aspect, the present invention provides an apparatus for processing image data, comprising a computing apparatus having a processor, memory and an operating system supporting computer processes, an image data process arranged to receive image data, and a meta-data process arranged to process the image data to produce meta-data about items or events that may be of interest to an end-user.

In an embodiment, the meta-data may comprise coordinate data or other positional data of objects. It may comprise an outline of an image of an object. In an embodiment, the meta-data may comprise any characteristics of items or events from the image data. These could include colour, direction, speed and other characteristics. The apparatus may comprise an identification process which is arranged to identify objects or events. For example, the identification process may include software comparing imaged faces with stored faces (e.g. face identification process), to identify a person. The persons identification (e.g. name) may then be provided as meta-data. Other objects and/or events may be identified, other than persons.

In an embodiment, meta-data may include coordinates or an outline of an identified object/event in an image. This may be utilised to fetch or transmit high resolution image of the object/event and superimpose it on a background low resolution image which may previously have been collected. This "meta object" or event can be obtained to view more detail where a person wishes to.

In accordance with a twelfth aspect, the present invention provides a method of processing image data, comprising the steps of receiving image data of a scene, and processing the image data to produce meta-data about items or events that may be of interest to an end user.

In accordance with an thirteenth aspect, the present invention provides a computer program, comprising instructions for controlling a computer to implement an apparatus in accordance with the eleventh aspect of the invention.

In accordance with a fourteenth aspect, the present invention provides a computer readable medium, providing a computer program in accordance with the thirteenth aspect of the invention.

In accordance with a fifteenth aspect, the present invention provides a data signal, comprising a computer program in accordance with the thirteenth aspect of the invention.

BRIEF DESCRIPTION OF THE FIGURES

Features and advantages of the present invention will become apparent from the following description of embodiments thereof, by way of example only, with reference to the accompanying drawings, in which.

DETAILED DESCRIPTION OF EMBODIMENTS OF THE INVENTION

Figure 1:
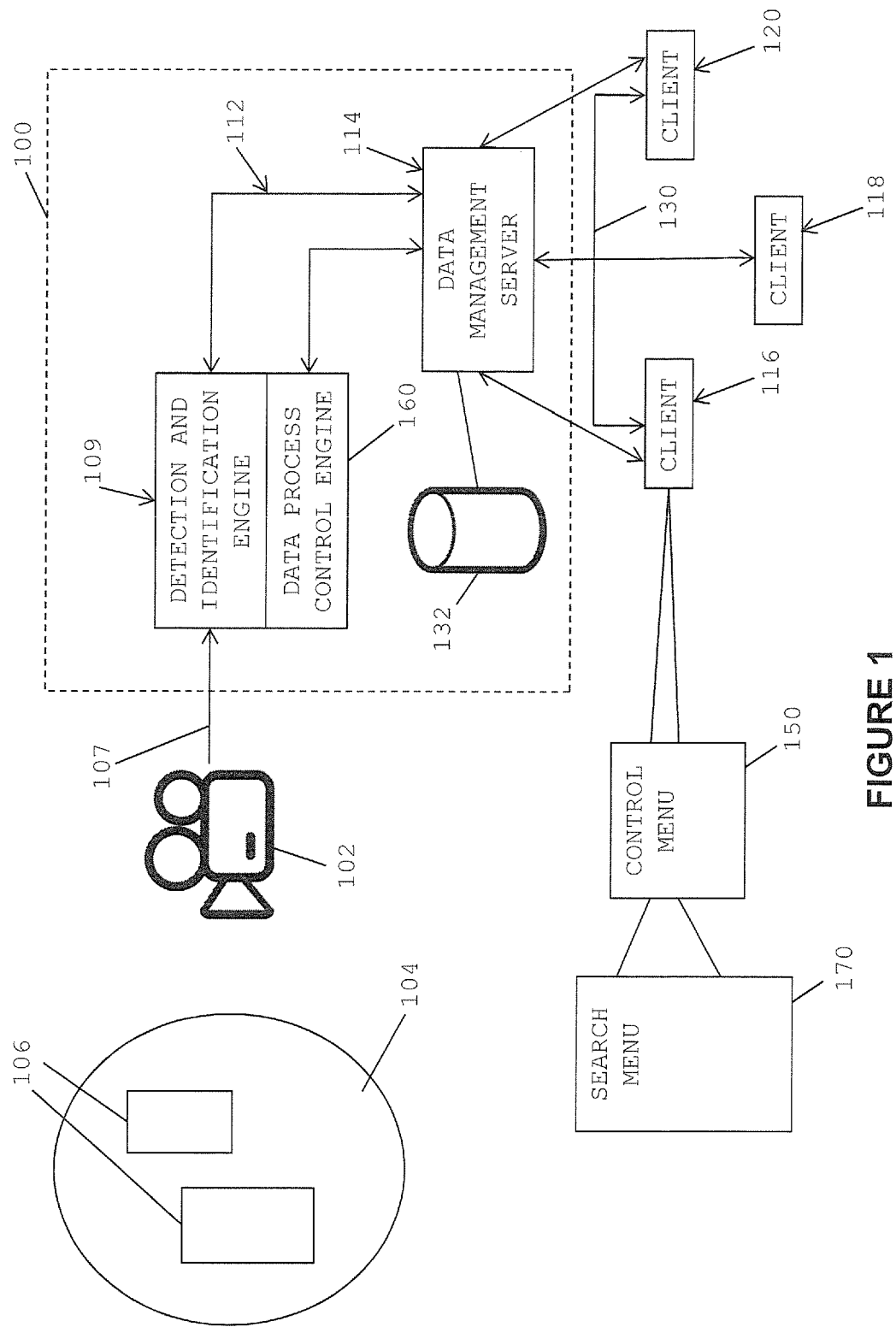
FIG. 1 is a schematic block diagram of an apparatus for conducting surveillance in accordance with an embodiment of the present invention.

Referring to FIG. 1, there is illustrated an apparatus for processing video data, generally designated by reference numeral 100. The apparatus comprises a computing apparatus, which in this example includes a data management server 114 and a detection and identification engine 109 which are arranged to implement an image data process for processing image data received from a surveillance device 102. The surveillance device, in this example, may be a high resolution camera focused on a scene 104 and producing images from the scene, providing image data 107 to the computing apparatus 100.

In this embodiment, the detection and identification engine 109 is also arranged to implement a detection process arranged to detect an item or event appearing or occurring in the scene. The image data process is responsive to detection of the item or event to process the image data for a portion of the scene where the item or event appears or occurs differently from the image data associated with the rest of the scene. For example, if the surveillance is particularly concerned with detecting faces of people, the detection process may be arranged to detect faces appearing in the scene. Image data associated with the faces may be processed to produce high resolution (i.e. processed at a different compression rate) than the rest of the image. In this example, therefore, the system saves on the amount of data needing to be sent and/or stored, but keeps the important data (faces) in high resolution.

In this example, the computing apparatus 100 also comprises a control process arranged to receive surveillance control data. The image data process is responsive to the surveillance control data to selectively process the image data according to surveillance parameters implemented by the control data.

In this example, the apparatus 100 comprises a data process control engine implementing the control process and arranged to receive the surveillance control data and implement selective processing of the image data according to the surveillance parameters.

In this example, the user control data is produced via client devices 116, 118, 120. These client devices may comprise any user device, such as a terminal, smart phone, laptop, PC or any other user device 116, 118, 120. Communications 130, which may be a network (such as the Internet) are utilised so that the user devices 116, 118, 120 can access the computing apparatus 100 and provide surveillance control data.

In this embodiment, a user can implement surveillance parameters to enable concentration on items or events of interest to the user. For example, they may wish to concentrate on vehicles that enter the scene 104. Via the control surveillance data, they advise the apparatus 100 that they wish to focus on any vehicle that enters the scene 104. The apparatus 100 then processes the image data to focus on the vehicle. In one example, it may do this by providing images relating to the vehicle in high resolution and the rest of the image data in relation to the rest of the scene in low resolution. This may be transmitted to the user device 116, 118, 120 and/or stored in the apparatus 100 database 132. The vehicle entering the scene is therefore detected and identified by the detection and identification process implemented by the detection identification engine 109, and then the image data associated with the portion of the scene where the vehicle appears is processed differently from the image data associated with the rest of the scene. Any processing may be applied. In this example, the image data associated with the vehicle is processed to produce relatively higher resolution compared with the image data for the rest of the scene. For example, where a high data, high resolution camera 102 is providing the image data, the image data associated with the vehicle is stored and/or transmitted at the highest available camera 102 resolution, and the rest of the image data relating to the scene is stored/transmitted at a relatively lower resolution. This saves on data storage and/or transmission.

Computer apparatus 100 may comprise a single computer implementing the data management server 114 and detection and identification engine 109, and database 132, or may comprise separate computers, one for the data management server 114 and one for the detection and identification engine 109. In this case, there is a network connection 112 between the detection identification engine 109 and data management server 114.

The apparatus 100 may be at a point remote from client systems 116, 118, 120 and remote from camera 102. Alternatively, it may be close to camera 102. Connection 107 between the camera 102 and the apparatus 100 may be a high bandwidth connection to enable high resolution data to be transmitted.

In another embodiment, the detection and identification engine 109, and data process control engine 160, may be implemented in the camera 102 processing apparatus. The network connection between the server 114 and the detection identification engine 109 in that case, may be broadband or may be a low resolution connection. If low resolution, processing may occur in a detection identification engine 109 to reduce the bandwidth information to be sent to the server, in accordance with the surveillance control data.

Figure 2:
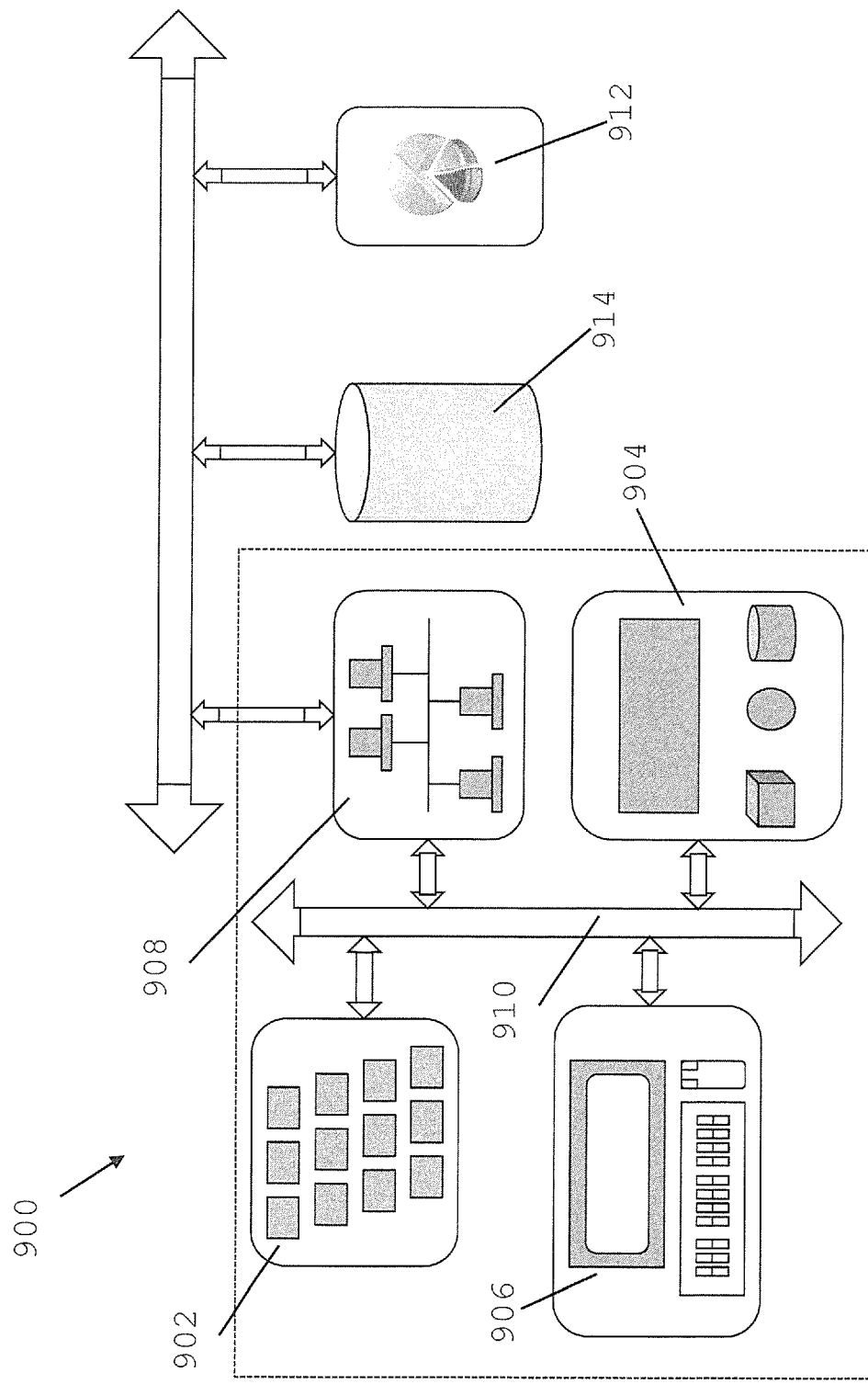
FIG. 2 is a schematic block diagram of an example computing arrangement which may be utilised for implementation of the surveillance apparatus of FIG. 1.

FIG. 2 is a schematic block diagram of an example computing arrangement which may be utilised for implementation of the apparatus 100. Where the detection and identification engine 109 and the data management server 114 are separate, then two computers in accordance with FIG. 2 may be utilised. Where they are together, a single computing device in accordance with FIG. 2 may be sufficient.

The computer 900 may comprise a server computer, personal computer, portable computer, or any other type of computing device. It may comprise computing hardware integrated with surveillance device 102 or separate from surveillance device 102.

The computer 900 comprises a suitable operating system and appropriate computer processes for implementation of the surveillance apparatus 100 of this embodiment of the invention.

The computer 900 comprises one or more data processing units (CPUs) 902; memory 904, which may include volatile or non-volatile memory, such as various types of RAM memories, magnetic discs, optical disks and solid state memories; a user interface 906, which may comprise a monitor, key board, mouse and/or touch-screen display; a network or other communication interface 908 for communicating with other computers as well as other devices; and one or more communication busses 910 for interconnecting the different parts of the system 900.

The computer 900 may also access data stored in a database 914 via communications interface 908. Database 914 may be a distributed database. The database is shown as 132 in FIG. 1.

A part or all of the computer apparatus may be implemented in the "Cloud".

This embodiment of the present invention is implemented by appropriate software providing instructions for operation of the computing apparatus hardware to implement the apparatus of the embodiment and the method of the embodiment. The computer processes facilitating embodiments of the present invention may be implemented as separate modules, which may share common foundations such as routines and sub-routines. The computer processes may be implemented in any suitable way, and are not limited to the separate modules. Any software/hardware architecture that implements the functionality may be utilised.

Referring again to FIG. 1, the data management server 114 is arranged to generate a control interface which can be accessed by client devices 116, 118, 120. The control interface may comprise a control menu 150, enabling the user to input surveillance control parameters from which surveillance control data may be generated by the system 100 to control image data processing. The control parameters can include any parameters. The parameters may implement very fine control.

The surveillance control data may enable the user, in this embodiment, to control the compression of the image data. For example, some parts of the image may be provided in high resolution, and some in low resolution. The control interface may include a control menu arranged to receive commands from the user for controlling image processing parameters such as compression. The commands may be as simple as controlling compression of a particular designated area of a scene. For example, the client may designate a doorway that appears in the scene to be of higher resolution in the image processing than the surrounding image. Another command may control the image processing to provide foreground image data in high resolution and background in low resolution or e.g. a lower frame rate, a lower compression. The control menu may include other commands enabling specific control of compression of the image data.

Different processing may be applied to different parts of the image data associated with different parts of the scene, as discussed above. Different compression types may be applied, different resolution, different frame rates, to different components of scene. Any type of processing may be applied.

As discussed above, the control data and control process in this embodiment may set parameters for the identification process (implemented by the detection and identification engine 109) to identify items or events in accordance with the parameters, and then apply different image processing to image data associated with the items or events. The detection and identification process may include appropriate algorithms to identify items or events, in concert with stored data in the database 132 (e.g. to "match" items or events with stored items or events e.g. faces, vehicles, etc).

There may be multiple events or items detected by the identification process. The image data associated with these multiple items or events may be processed differently from the rest of the image data, and even from the image data for the other items and events.

Detection and identification may include motion and non-motion detection algorithms. See applicants earlier International applications WO2009/135253 and WO034/044752, the contents of which are incorporated herein by reference.

Specific items and objects may be identified by cross-referencing the image data with data stored in database 132 in order to identify the item. Identification techniques may be directed to any of facial recognition, vehicle license plate recognition, or object recognition or other forms of identification.

In this embodiment, the detection and identification engine comprises a meta-data process which includes software and algorithms arranged to obtain meta-data from the image data. The meta-data is data about objects, items, events appearing in the scene, for example. The meta-data may comprise an identity of an item, dimensions of an item, motion, colour, any other characteristic or behaviour.

The control data includes commands that can utilise the meta-data to affect the image processing. For example, the control data could include a command such as "provide all red objects in high resolution". This command will affect the image processing to identify that object and provide them in high resolution. More fine control could be applied with other commands e.g. "any red vehicle that enters the scene" will result in the image of the red vehicle being provided in high resolution.

Via the control menu 150, the user may provide fine control rules for the user surveillance parameters. For example, fine control instructions such as the following may be sent from the client 116, 118, 120 to the data management server 114 and onto the data process control engine 160, to control the detection and identification engine to observe, and provide at different compression (e.g. higher resolution):

Any vehicle that enters the scene
Any red vehicle that enters the scene
Cars but not trucks or bikes
Any person who falls down
The face of someone who abandons a bag and walks away
The face of every person who enters the scene
The face of every person wearing a white shirt that enters the scene.

There may be many more control parameters that can generate control data. The user may have very fine control, therefore, over the surveillance parameters, via the control interface 150.

As well as varying the compression depending on the control commands, the control menu may also be used to search for items having particular attributes or behaviour. For example, a user may wish to be alerted when a particular item or event occurs. For example, when a person falls down they may require an alarm. The control menu enables setting of the commands to do this. Furthermore, the image of the person falling down may be provided in high resolution (different compression).

The control interface may also be used to search video that is stored in database 132 after the event. Search commands could be for "any vehicles entering the scene between particular dates". The data management server will access the processed video and return video in accordance with the command. The vehicle(s) may be provided in high resolution. The user can therefore control a number of aspects of the image processing. They can control the compression of the image in a fine manner, determining different compression rates for items, objects and events appearing in a scene. They may monitor the video as it occurs, they may search previously stored video. A further alternative is that the data management server will provide alarms, in accordance with the control instructions, and the user can subsequently access the video or a video can be provided with the alarm.

In more detail, the surveillance camera 102 can be any type of electronic camera arranged to produce a digital or analog image stream. Where the surveillance camera 102 outputs an analog image stream, the image stream is transformed into a digital output by an analog to digital convertor. The camera 102 may be a any IP camera having a pixel resolution of over 1 mega-pixel, although any other type of camera may be used.

In this embodiment, the general scene of the area under surveillance 104 may have one or more areas of interest 106. These may define areas which are to be specifically monitored for items, events, or any other particular subject matter. For example, these areas could be a crossing, no parking zone, hallway, counter, secure entry or exit or any other areas that require monitoring. In this embodiment, a high resolution image data stream 107 is transmitted to the apparatus 100. In other embodiments (see applicant's earlier patent application referenced above, for example) the data stream 107 may comprise a plurality of image streams having different compression rates and providing different resolution.

The detection identification engine 109 is arranged to receive the image data 107 and process the image data in accordance with the image data process. The image data process, implemented by the detection and identification engine 109, is able to implement functionality such as redaction, motion detection, non-motion detection, detection of objects, faces, or any other items, or undertake any other processing.

In one example, the image processing includes a detection and identification process which detects an unusual act, event or detects an object within the areas of interest 106. It then processes the image data associated with the detection area to further identify what the act, event or object might be.

In the applicant's earlier application referenced above, a low resolution data stream is used to detect an unusual act, event or object, once the area is detected a high resolution data stream of that area is used for identification.

The data management server 114 stores and collates the data received from the detection and identification engine 109. For example, the server 114 may store image data flagged as having had an unusual act or object detected into a database 132 mapped to any specific data relating to the subject identified as well as a time stamp of the unusual act detected. This data can then subsequently be accessed by the client devices 116, 118, 120. The client devices, 116, 118, 120 receive information from the server 114 regarding the detection of unusual acts, items etc. and will act on this information accordingly. This may simply be a triggering of an alarm for a user of the client device or the transmission of the nature or the detection to the device. The client devices may also send requests to the management server specifying desired scenes and areas of interest, and other information.

In this embodiment, the user, via a client device 116, 118, 120 and communications 130 is able to provide user surveillance parameters via control menu 150 to the data management server 114, in the form of surveillance control data. The surveillance control data is implemented by the data process control engine 160, to control the image data process via the data detection and identification engine 109.

The user is able to configure the image data processing via their control menu 150.

As discussed above, the user can have quite fine control over how the image data is processed. For example, they may wish image data to be processed to emphasize the items and/or events that they may be interested in. For example, if they want to see any "red vehicle that enters the scene" the detection and identification engine would first of all detect motion. It would then process the parts of the scene where the motion occurs to identify a vehicle and also review the colour provided by the pixels to determine whether the vehicle is red. The image data for the red vehicle in motion may then be compressed at a different rate to the image data of the rest of the scene so that the red vehicle in motion is shown in high resolution. This data may then be stored in database 132 and/or forwarded to the client devices 116, 118, 120 for review. An alarm may also be issued so that the user knows that a red vehicle has entered and moved into the scene.

Using the control menu and generating surveillance control data, therefore, a user can control how the detection and identification engine operates and how the image data is processed. They can select items, objects, they can even determine type of processing that they want implemented. For example, they may prefer all moving objects to be provided to them in high resolution. Or they could prefer all stationary objects detected by non-motion detection to be provided in high resolution. The user may determine type of processing to be applied. For example, they may be able to vary the frame rate or the resolution generally. The user can essentially select any type of processing or emphasis that they may require.

The processing may include different compression rates, it may include different types of compression. It may include any type of processing. Different types of compression, different compression rates other different types of processing may be used for different portions of the scene (image data associated with different portions of the scene), for example depending on items or events identified within the scene.

Multiple levels of compression could be implemented, for example. Faces at very high resolution, the rest of the body at medium resolution and the background in lowest resolution, for example.

Image processing could be modified by a time schedule. From 9 to 5, for example, one type of compression could be implemented, and at night there might be a different set of rules.

Separately, in this embodiment, the image data process is arranged to separate the image data into foreground image data and background image data and process the foreground image data at higher frame rates and higher resolutions in the background data. In other embodiments this may be done under the control of the user.

The background separation process is described in applicant's earlier patent application (International Patent Application Publication No. WO 03/044752 and corresponding U.S. Pat. No. 7,688,997). The contents of these documents are incorporated herein by reference. This document also discloses an example of a non-motion detection process and system. As the person skilled in the art will appreciate, embodiments of the present invention will operate with any type of motion or non-motion detection algorithm.

Figure 3:
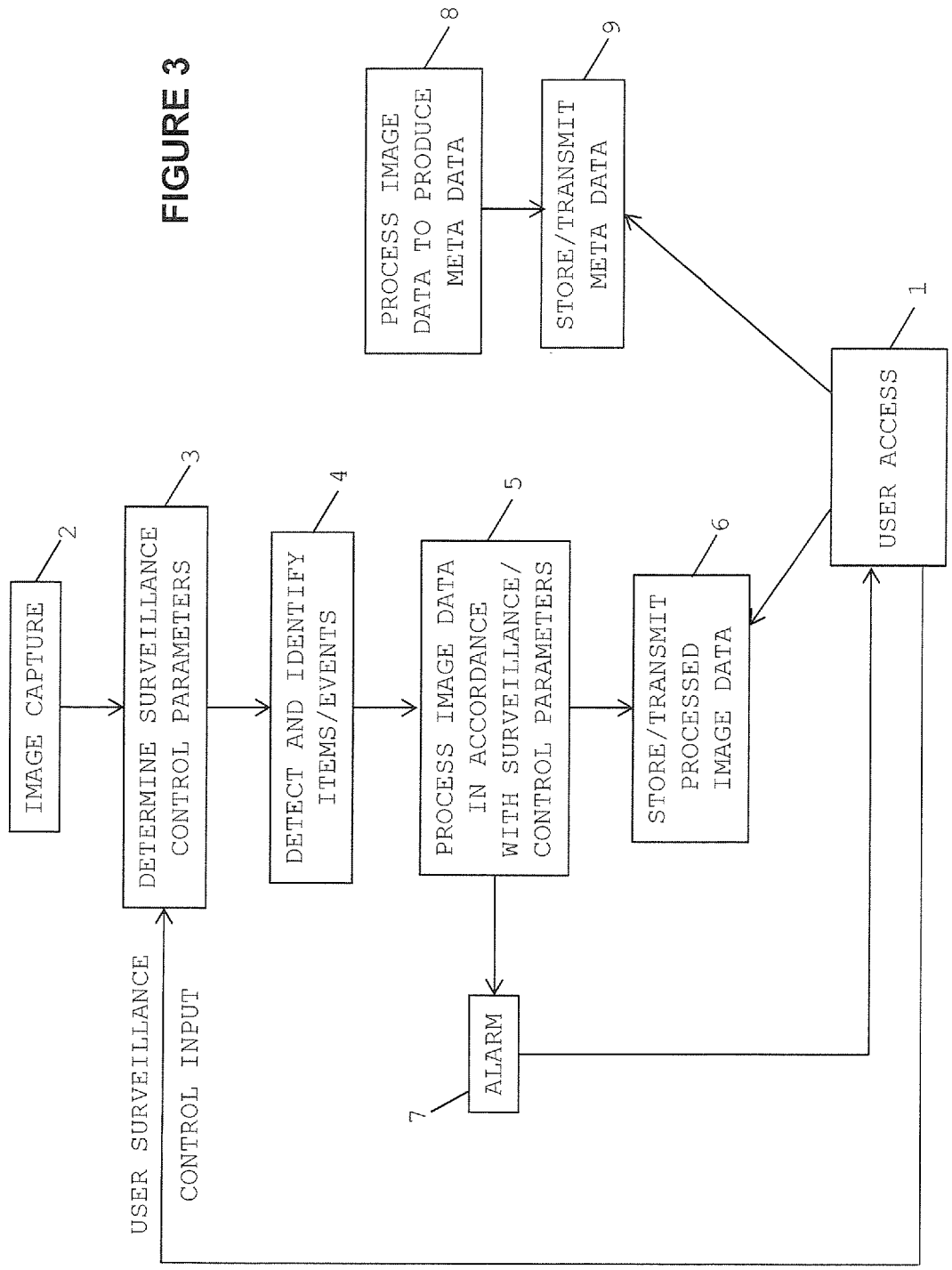
FIG. 3 is a schematic flow diagram illustrating operation of an embodiment of the present invention.

Referring to FIG. 3, a flow diagram of a process in accordance with an embodiment of the present invention is illustrated. As discussed above, the user has access (step 1) via their client device 116, 118, 120 to input surveillance control parameters. An image of a scene 104 is captured by the camera device 102 (step 2). The data process control engine 160 determines the surveillance control parameters (step 3) and controls the image data processing by the detection and identification engine accordingly (step 4 and step 5). The image data and/or data associated with the image data is stored or transmitted (step 6). Where an event occurs or an object is identified that the user requires notifying of an alarm (step 7) may be implemented.

In this embodiment, the image data is processed to to also produce metadata (step 8). The metadata may include x-y coordinates or an outline of each object identified. This can be sent to overlay the video to the user. Any other metadata can be sent e.g. colour, direction, speed of an object. The metadata can be stored in the database 132 (step 9). It can be accessed at any time from the database by the user.

Via their client device, the user may input control data which utilises the meta-data to control image processing and/or search the video produced. The control parameters input by the user may be in the form of natural language commands, as discussed above. For example, "any red vehicle that enters the scene" may be processed to produce a high resolution image of the vehicle. Other examples are given above.

A search menu is provided via the client device 116, 118, 130. The search menu 170 (FIG. 1) may be provided as an application on a client device or served over the web by the data management server 114.

Figure 4:
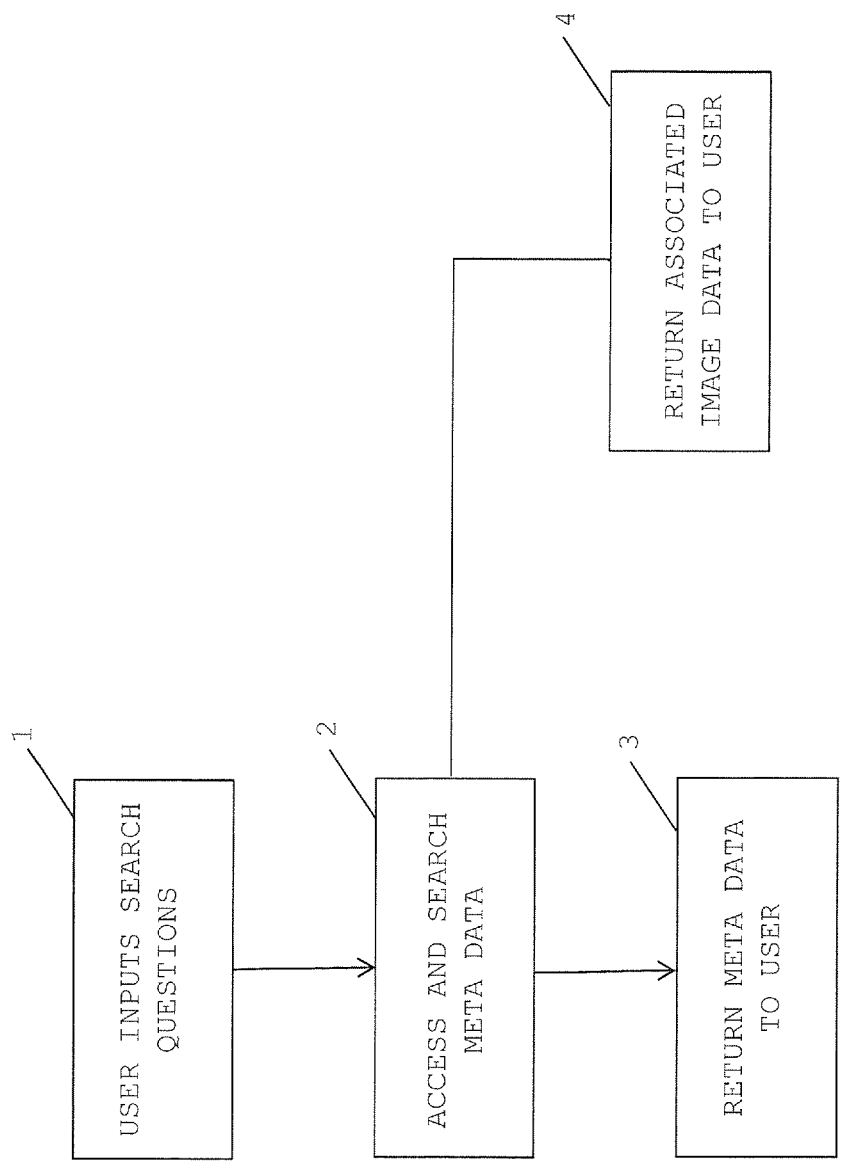
FIG. 4 is a further flow diagram illustrating implementation of operation of an embodiment of the present invention.

Referring to FIG. 4, the user inputs search questions (step 1) to access and search the metadata (step 2) in the database 132. Metadata may be returned to the user (step 3) and also video may be returned to the user (step 4).

The search menu enables complex questions to be input to search the metadata and image data. For example, questions that could be asked of the system are things like "find me all red vehicles that turn left from 9 am to 10 am". Or "find me all vehicles that turn left from 9 am to 10 am when the traffic signal shows that left turns are not permitted".

Other complex questions could be input.

In some video systems (VMS), all video is obtained and stored at least in relatively low resolution. Where, in accordance with an embodiment of the present invention, events/objects are stored separately in higher resolution, the apparatus may be able to access the low resolution stored data and request, using meta-data, the higher resolution image to be superimposed on the low resolution image. For example, faces may be superimposed in high resolution on low resolution faces of the captured low resolution data.

The high resolution image can be considered to be a "meta object". A user may obtain a meta object to superimpose a higher resolution image onto a low resolution image that may already have obtained.

This embodiment may also implement a redaction process when processing the image data. Some of the areas of the image could be redacted and focus could be on others. This could be based on the authority level of the user. Some users may receive redacted images and others may not. Redaction may occur at the "front end" i.e. the picture and identification engine 109 may be programmed to identify and redact various objects/event in an image. For example, various known persons may be identified and their faces redacted. In other embodiments, redaction may occur in subsequent, post processing.

The detection and identification engine 109 is arranged to identify specific objects by cross-referencing the image data with a database in order to identify the object. The identification engine is a programmed software in this case, able to implement algorithms to identify faces, vehicle license plates, object recognition or other forms of identification algorithms.

In the above embodiments, control data and a control process can be utilised to allow user input to control the image processing. In other embodiments, the apparatus may be preset with image processing parameters and there is no end user control. The image processing parameters may be complex, however, allowing the identification of multiple items and events, and multiple image processing responses.

The present invention is not limited to surveillance. It could be applied in other image processing areas.

In the above embodiment, only a single camera 102 and scene 104 is shown. There may be many cameras working with the detection and identification engine and data management server. Further, there may be many servers and detection identification engines that the client can access.

Figure 5:
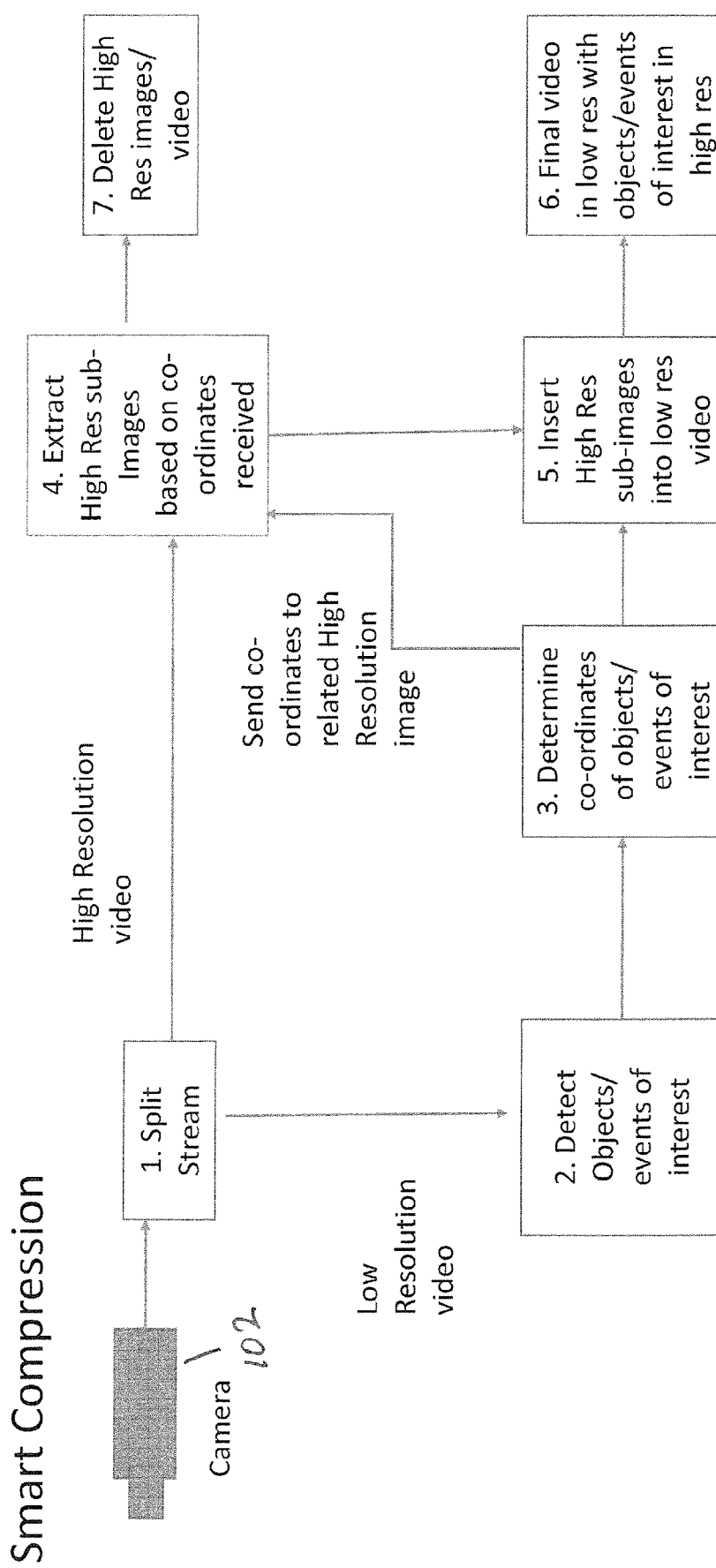
FIG. 5 is a flow diagram illustrating operation of an embodiment of the present invention.

FIG. 5 is a flow diagram illustrating operation of an embodiment of the present invention. A camera or cameras 102 are arranged to obtain video data of a scene. At step 1, the data stream from the camera(s) 102 is split into two streams. The first stream is a high resolution video stream and the second stream is a low resolution video stream. At step 2, the low resolution video stream is processed to detect objects/events of interest. Any detection analytics may be utilised to implement the detection. For example, non-motion detection may be implemented, motion detection, face detection, or any other type of detection. There are many known detection analytics available for analysing video.

At step 3, the coordinates of objects or events of interest are determined. These coordindates are then sent for processing of the related high resolution image stream.

At step 4, high resolution sub images from the high resolution image stream are extracted based on the coordinates that have been determined.

At step 5, the high resolution sub images are inserted into the low resolution video stream.

At step 6, the final video is stored and/or transmitted, in low resolution with objects/events of interest in high resolution.

At step 7, the high resolution images/video may be deleted. That is, they do not need to be stored, saving on processing.

Figure 6:
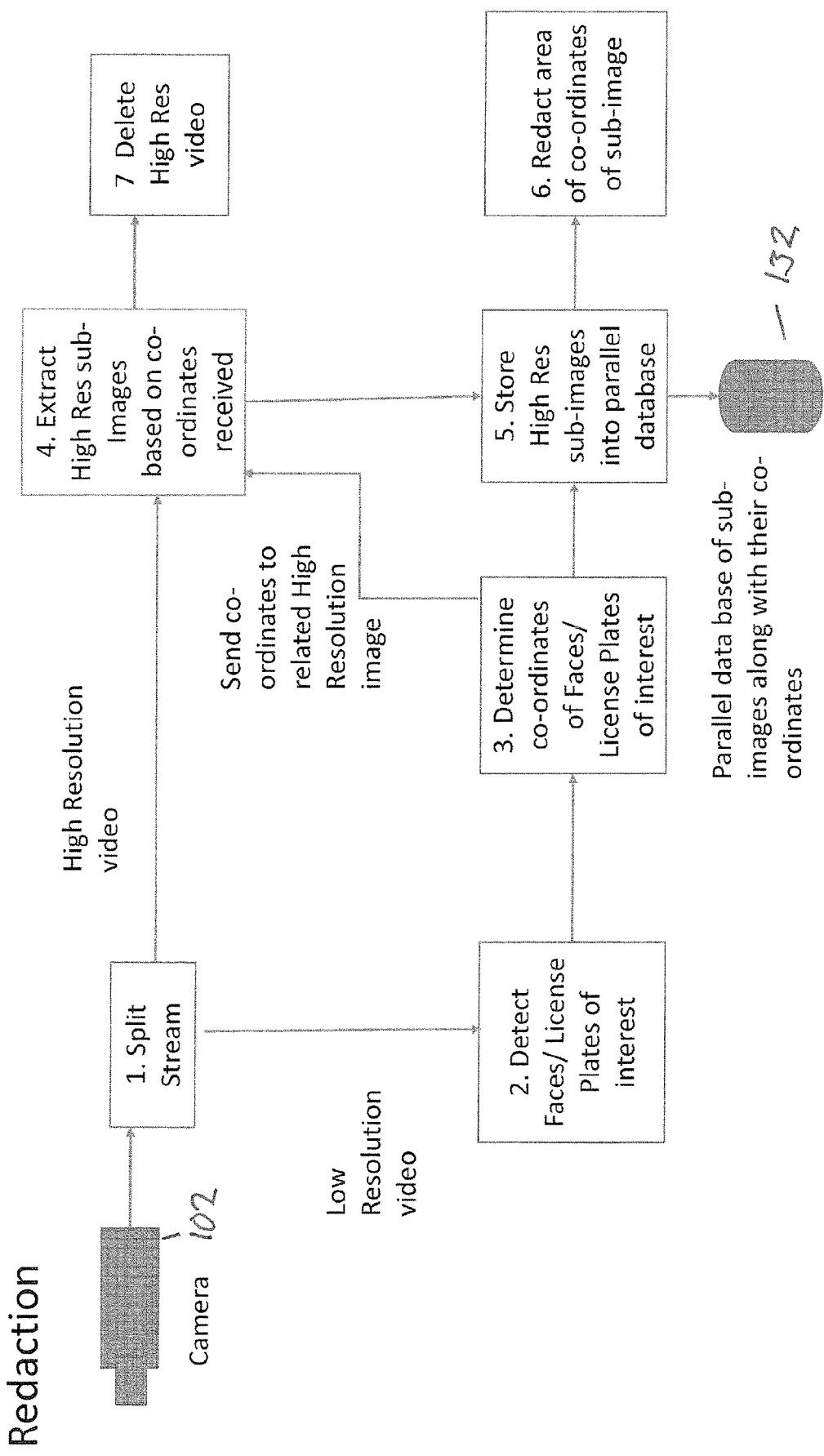
FIG. 6 is a flow diagram illustrating operation of an embodiment of the present invention.

FIG. 6 is a flow diagram illustrating how a redaction process in accordance with an embodiment of the present invention is implemented.

In some cases, certain images may need to be redacted. This may depend on authority of an end user viewing the images, or may just be a requirement, depending upon the object/event being viewed. For example, in some cases, in order to maintain privacy, faces of persons or particular persons may be redacted so that they cannot be identified.

A high resolution camera 102 obtains image data of a scene and provides the image data for processing in an image stream.

At step 1, the image stream is split into a high resolution video stream and a low resolution video stream.

At step 2, the objects/items or events of interest are detected. In this embodiment, people's faces and license plates of interest may be detected. Any object or event may be detected in embodiments, however.

At step 3, the coordinates of the detected faces and license plates of interest are determined and sent for processing of the high resolution image.

At step 4, high resolution sub images are extracted based on the received coordinates, from the high resolution video stream.

At step 5, these high resolution sub images are stored into a database 132, which stores the sub images along with the coordinates.

At step 6, images to be viewed by a user are redacted, depending on the redaction rules so that the area of the coordinates of the sub image are obscured or otherwise redacted.

At step 7, the high resolution video is deleted.

Figure 7:
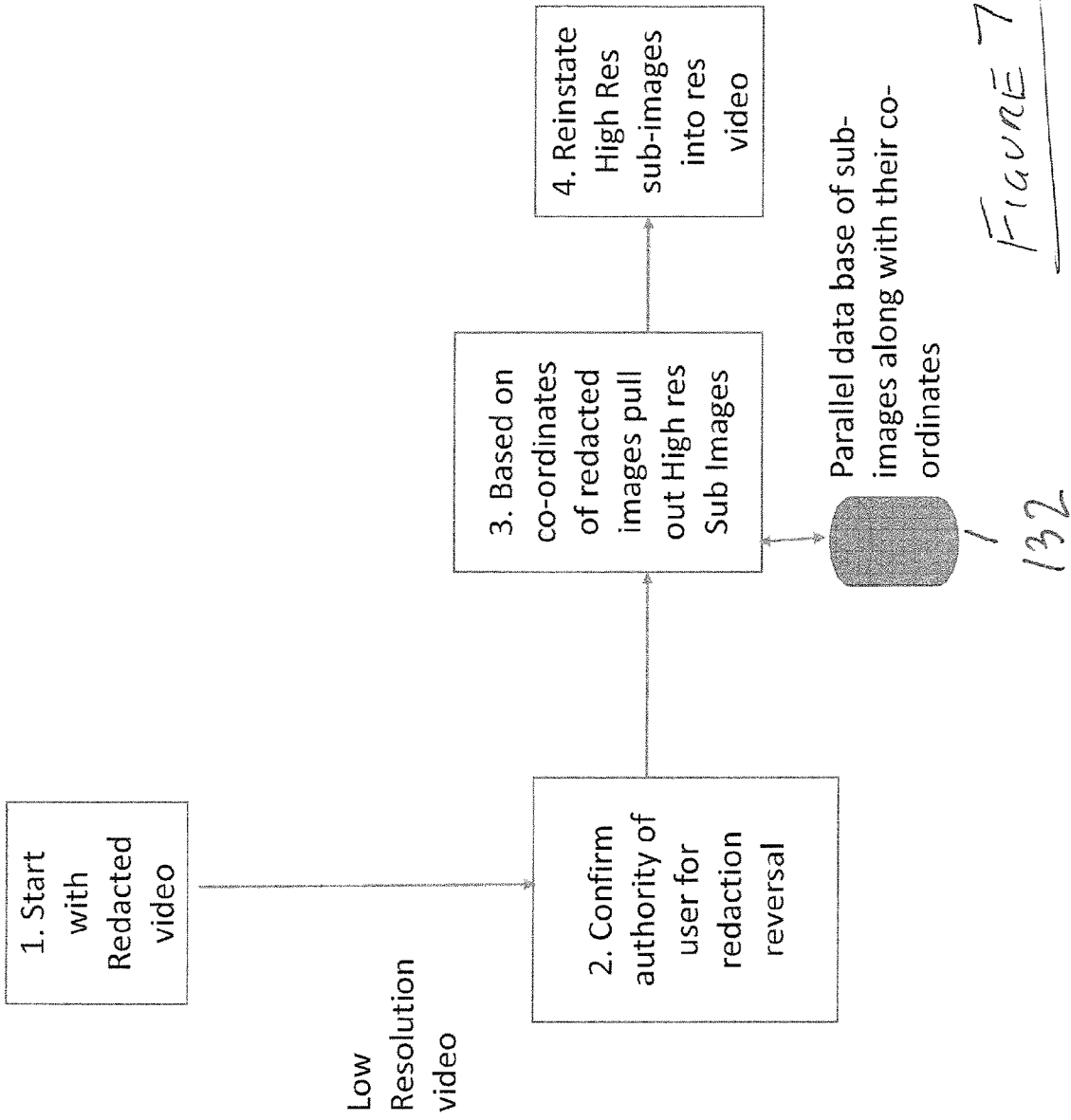
FIG. 7 is a flow diagram illustrating operation of an embodiment of the present invention.

FIG. 7 is a flow diagram illustrating a redaction reversal process in accordance with an embodiment of the present invention.

At step 1, the redacted video is obtained in low resolution.

At step 2, the authority of the user for redaction reversal is confirmed.

At step 3, based on the coordinates of the redacted images, the high resolution sub images are pulled from the database 132.

At step 4, the high resolution sub images from the database can be replaced into the video.

Figure 8:
FIGS. 8 through 10 are example video images illustrating operation of an embodiment of the present invention.
Figure 9:
Figure 10:

FIGS. 8, 9 and 10 illustrate an example output of an embodiment of the present invention. In this embodiment, the apparatus is arranged to detect faces and provide faces in relatively high resolution as compared with the rest of the image data from a scene.

FIG. 8 shows a high resolution image of a scene, obtained by a high resolution camera. As discussed previously, the transmission of all the video data to transmit the entire image in high resolution and the entire video, is prohibitive. Similarly, storage of this data in high resolution is extremely costly.

FIG. 9 shows the same image in relatively low resolution. It will be appreciated that such a low resolution image, although satisfying transmission and storage requirements, may not be sufficient to, for example, identify people in the picture from their faces.

FIG. 10 shows the same image, where the image data has been processed in accordance with an embodiment of the present invention. It can be seen that the majority of the image is low resolution, but the faces of the persons have been detected and provided in high resolution. This compromises, and optimises the data required to be transmitted and/or stored.

Figure 11:
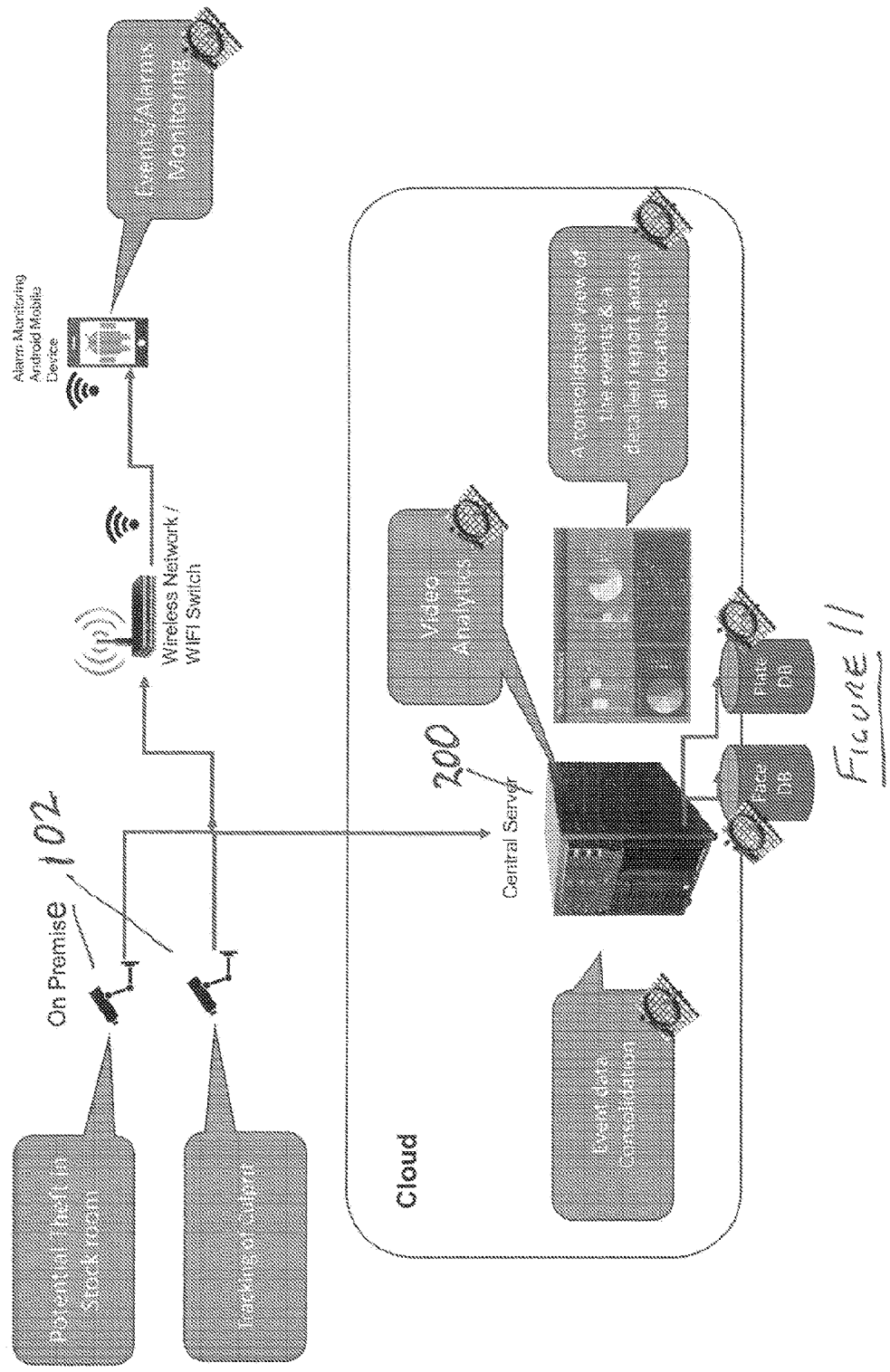
FIG. 11 is a schematic block diagram of a centralised architecture that can be utilised in accordance with an embodiment of the present invention.

FIG. 11 is a schematic diagram of a centralized architecture which may be implemented by an apparatus in accordance with an embodiment of the present invention. In this embodiment, cameras 102 are connected directly to a local, central server 200. Savings on storage of data can be obtained with this apparatus, as not all video data is necessary to be stored (as discussed above).

Figure 12:
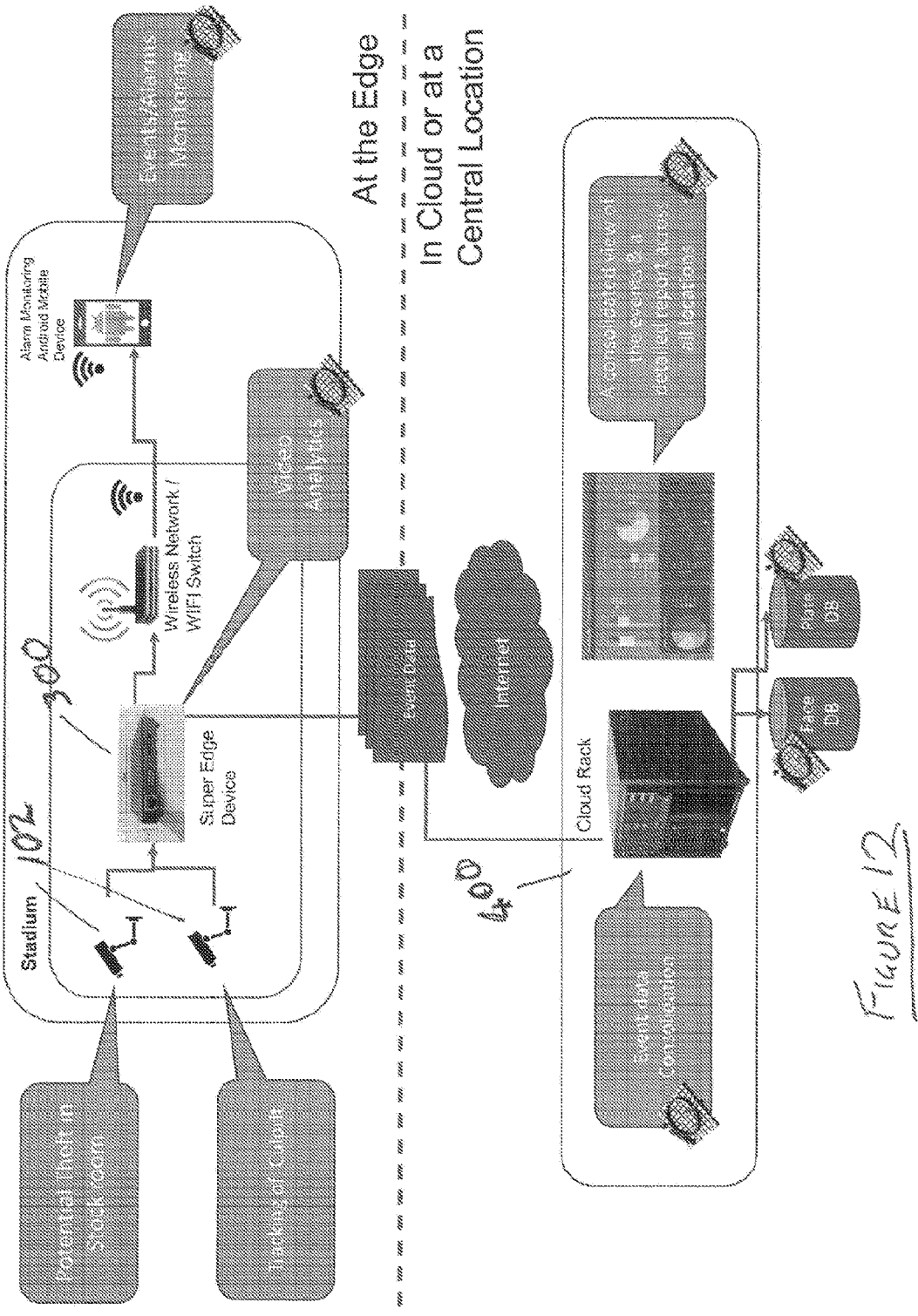
FIG. 12 is a schematic block of a distributed architecture for an apparatus in accordance with an embodiment with the present invention.

FIG. 12 shows a distributed architecture embodiment. Compression is done by a processor 300 at the camera end. Data is then transmitted and stored remotely e.g. in the Cloud 400.

Figure 13:
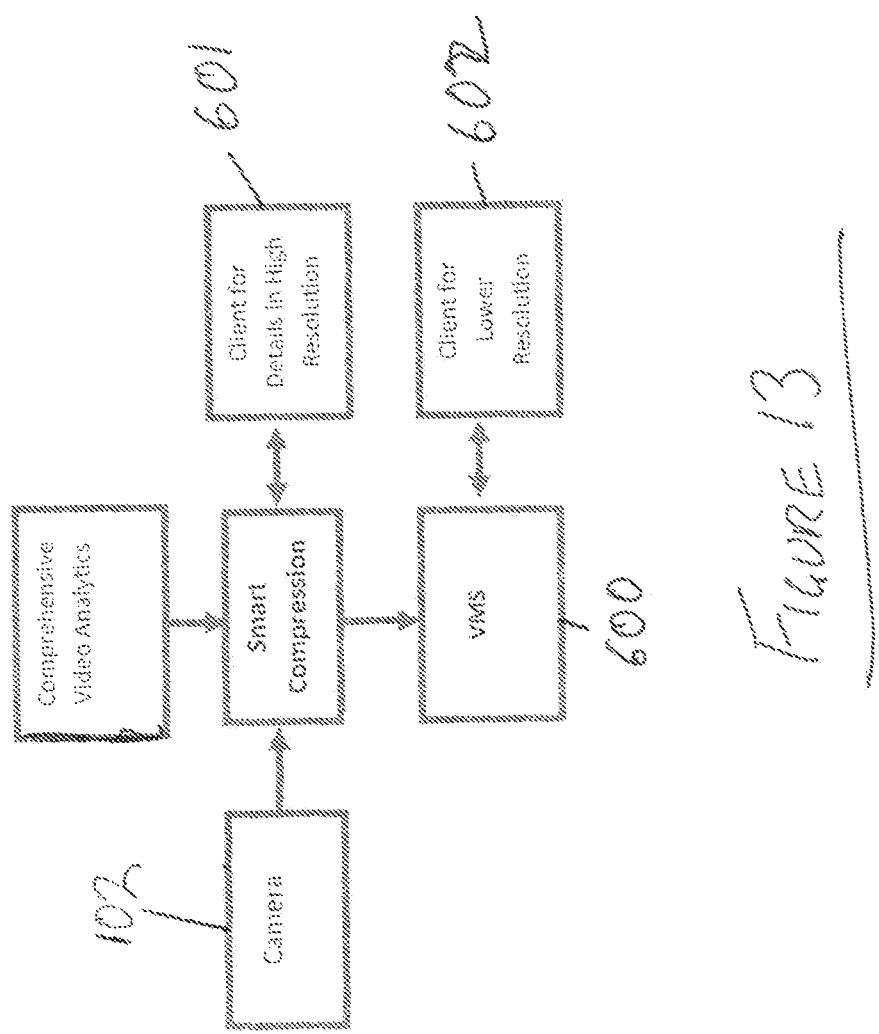
FIG. 13 illustrates a more generic overall architecture for an embodiment of the present invention.

FIG. 13 shows a more generic architecture of an embodiment. Information recorded in the VMS 600 can be viewed continuously. Information on key events can be displayed independently at the desired high resolution. The results are portrayed on dual monitors as shown in FIG. 13 (601 and 602). The advantage of dual monitors is that the first one (602) can be used as the primary user interface. The second one can provide details such as special reports showing counting across multiple cameras or potential matches for people or vehicles using various recognition systems.

A high resolution image usually covers a larger area than a low resolution image. This is because the pixels in each image tend to be packed with the same density so the image with more pixels covers a larger area.

This can create a challenge when one attempts to impose a high resolution sub-image eg a face onto a low resolution image. If this task is performed in the view that is normally presented the Face will appear to be disproportionately larger than the rest of the body by a factor equal to the difference in resolution.

To compensate for this the in an embodiment of the invention, low resolution image is unpacked and presented such as to cover the same area as the high resolution image. This is achieved by spacing out the pixels in the low resolution image to a lower than normal density.

It will be appreciated that embodiments of the present invention may be implemented by a variety of hardware and software architecture. General purpose computers may be programmed to implement embodiments of the encryption process. Hardware architecture is not limited to general purpose computers or servers, but any architecture could be implemented, including client server architecture, central processing unit/terminal architecture, or any other architecture. The system may be implemented utilising mobile devices, such as tablet computers and laptop computers, or a dedicated bespoke architecture. Software may be used to program processors, to implement embodiments of the invention. Programmable hardware may be used to implement embodiments, such as field programmable gate arrays, programmable gate arrays and the like.

Where software is used to implement the invention, the software can be provided on computer readable media, such as disks, or as data signals over networks, such as the Internet, or in any other way.

In embodiments, hardware architecture already pre-programmed to implement embodiments of the invention may be provided.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. An apparatus for processing image data, comprising
a computing apparatus having a processor, a memory, and an operating system supporting computer processes,
an image data process arranged to receive image data of a scene,
a detection and identification process arranged to automatically detect an occurrence of at least one event of interest involving an item in the scene, said detection being in accordance with pre-set or user-input parameters to define the at least one event of interest and the item, wherein the parameter or parameters defining the at least one event of interest is or are configured to define an event image data associated with said at least one event of interest, the event image data including image data at a portion of the scene where the event appears or occurs, wherein the portion of the scene is a portion focused about the event, captured in a time period starting before detection of the item, the event image data including at least image data not attributable to a motion of the item;
the image data process being responsive to detection of the event to focus on the detected item or event, by processing the event image data for the portion of the scene where the event appears or occurs, differently from the image data associated with the rest of the scene;
wherein the image data of the scene comprises a high resolution video stream and a low resolution video stream;
wherein the event image data includes high resolution sub images extracted from the high resolution video stream for long term storage, the sub images corresponding to the portion of the scene where the event appears or occurs, and wherein the image data process is configured to insert the high resolution sub images into the low resolution video stream.

2. The apparatus in accordance with claim 1, wherein the at least one occurrence of the at least one event of interest comprises occurrences of multiple events, and the image data process is arranged to process the image data for the detected occurrences of one or more of the multiple events of interest differently from the image data for the detected occurrences of another one or more of the multiple events of interest.

3. The apparatus in accordance with claim 1, further comprising a control process arranged to receive user surveillance control data, and the detection process is responsive to the control process, to control the detection of occurrences of events according to surveillance parameters obtained from the control data.

4. The apparatus in accordance with claim 3, wherein the image data process is responsive to the control process to selectively process the image data according to parameters obtained from the control data.

5. The apparatus in accordance with claim 3, wherein the user surveillance control data comprises language statements input by the user.

6. A method of processing image data, comprising the steps of receiving image data of a scene,
detecting an occurrence of at least one event of interest involving an item in the scene, in accordance with pre-set or user-input parameters to define the at least one event of interest and the item, an event image data associated with said at least one event of interest, including image data at a portion of the scene where the event appears or occurs, wherein the portion of the scene is focused about the event, captured in a time period starting before detection of the item, the event image data including image data not attributable to a motion of the item; and
responsive to the detection of the occurrence of the event, processing the event image data for the portion of the scene where the event occurs, differently from the image data associated with the rest of the scene;
wherein the image data of the scene comprises a high resolution video stream and a low resolution video stream;
wherein the event image data includes high resolution sub images extracted from the high resolution video stream for long term storage, the sub images corresponding to the portion of the scene where the event appears or occurs, and the high resolution sub images are inserted into the low resolution video stream.

7. The method in accordance with claim 6, wherein the step of detecting an occurrence of an event of interest comprises the step of detecting occurrences of multiple events in the scene.

8. The method in accordance with claim 7, wherein the step of processing the image data for the detected occurrences of the multiple events comprises the step of processing the image data for the detected occurrences of one or more of the multiple events differently from the image data for the detected occurrences of another plurality one or more of the multiple events.

9. The method in accordance with claim 6, comprising the further step of receiving user surveillance control data, and controlling the detection of occurrences of events according to surveillance parameters obtained from the control data.

10. The method in accordance with claim 9, comprising the further step of selectively processing the image data according to parameters obtained from the control data.

11. The method in accordance with claim 9, wherein the user surveillance control data comprises language statements input by the user.

12. The method of claim 6, further comprising
redacting said image data for said portion of the scene where the occurs;
storing said event image data in a separate secure database;
wherein a high resolution sub image corresponding to the portion of the scene where event occurs is extracted from the high resolution video stream and is stored in the separate secure database; and
wherein an area of the low resolution video stream corresponding to the location of the stored high resolution sub image is obscured.

13. The method of claim 12, wherein said high resolution image data for said portion of the scene is saved as a meta object along with meta-data defining the outline or position of said detected event or item.

14. The method of claim 13, further comprising, upon request or authorization, reversal of said redacting of said image data.

15. The method of claim 14, wherein said reversal comprises retrieving the stored high resolution image data and inserting it into the surveillance image based on the meta-data defining the outline or position of said event or said item;
  wherein the high resolution sub image corresponding to the portion of the scene where the item or event appears or occurs is retrieved from the separate secure database; and
  wherein the retrieved high resolution sub image is inserted into the low resolution video stream at the area of the low resolution video stream corresponding to the location of the retrieved high resolution sub image.

16. An apparatus for processing image data of a scene, comprising
  a computing apparatus having a processor, memory and an operating system supporting computer processes,
  a control process arranged to receive user surveillance control data and to process said control data to obtain surveillance parameters,
  an image data process arranged to receive image data, the image data process being responsive to the control process to selectively process the image data according to the surveillance parameters, and
  a detection process arranged to automatically detect an occurrence of at least one event involving an item in the scene,
  the detection process being responsive to the control process, to control the detection of items or events according to the surveillance parameters,
  wherein the detection is in accordance with pre-set or user-input parameters to define the at least one event of interest and the item, wherein the parameter or parameters defining the at least one event of interest is or are configured to define an event image data associated with said at least one event of interest, the event image data including image data at a portion of the scene where the event appears or occurs, wherein the portion of the scene is a portion focused about the event, captured in a time period starting before detection of the item, the event image data includes image data not attributable to a motion of the item;
  wherein the received image data comprises a high resolution video stream and a low resolution video stream;
  wherein the event image data includes high resolution sub images extracted from the high resolution video stream, the sub images corresponding to the portion of the scene where the event occurs, and the high resolution sub images are inserted into the low resolution video stream.

17. The apparatus in accordance with claim 16, wherein the user surveillance parameters comprise one or more of:
  object(s) of interest;
  a specific object;
  foreground of a scene;
  a variable resolution/frame rate/section;
  an event;
  a face.

18. The apparatus in accordance with claim 16, comprising a user control interface enabling a user to input user surveillance control data.

19. The apparatus in accordance with claim 16, comprising a meta-data process which is arranged to process the image data to produce data about items or events.

20. The apparatus in accordance with claim 19, wherein the user surveillance control data comprises commands which affect control of the image data process via the meta-data.

21. The apparatus of claim 19, wherein said high resolution image data of said event or said item, along with meta-data which define an outline or a position of the item or event in the image data of the scene, are saved as a meta-object.

22. The apparatus of claim 21, wherein said meta-object is superimposed on a low resolution image data of the scene at a location according to the meta-data defining the outline or position of said event or said item.

23. The apparatus of claim 21, including compressing the high resolution image data of said event or item to multiple levels, wherein a portion of image data of said event or item is compressed to a higher resolution than another portion of said image data of said event or item.

24. The apparatus of claim 21, including a redaction process arranged to redact image data at a location according to the meta-data defining the outline or position of said event or said item;
  wherein a high resolution sub image corresponding to the outline or position of said event or said item is extracted from the high resolution video stream and is stored in a database; and
  wherein an area of the low resolution video stream corresponding to the location of the stored high resolution sub image is obscured.

25. The apparatus of claim 24, wherein said item in respect of which image data is redacted is a face of a person.

26. The apparatus in accordance with claim 16, wherein the control data comprises natural language commands.

27. The apparatus in accordance with claim 16, wherein the image data process is arranged to separate the image data into foreground image data and background image data, and process the foreground image data differently to the background image data.

* * * * *